United States Patent [19]
Palmer

[11] Patent Number: 5,452,710
[45] Date of Patent: * Sep. 26, 1995

[54] SELF-SUFFICIENT APPARATUS AND METHOD FOR CONVEYING SOLAR HEAT ENERGY FROM AN ATTIC

[75] Inventor: Edward G. Palmer, Elk River, Minn.

[73] Assignee: Solar Attic, Inc., Elk River, Minn.

[*] Notice: NOTE-DISCLAIMER The portion of the term of this patent subsequent to May 14, 2008 has been disclaimed.

[21] Appl. No.: 219,015

[22] Filed: Mar. 28, 1994

[51] Int. Cl.⁶ ......................................... F24J 2/00
[52] U.S. Cl. .................... 126/572; 126/621; 126/623; 126/714; 52/173.3; 136/248; 136/291; 165/48.2
[58] Field of Search .................... 136/248, 291; 126/572, 621, 623, 714; 165/48.2; 52/173.3

[56] References Cited

U.S. PATENT DOCUMENTS

| Re. 32,607 | 2/1988 | Smith | 126/586 |
|---|---|---|---|
| 4,026,267 | 5/1977 | Coleman | 126/617 |
| 4,147,157 | 4/1979 | Zakhariya | 126/586 |
| 4,241,725 | 12/1980 | Emon et al. | 126/638 |
| 4,242,872 | 1/1981 | Shaw | 62/235.1 |
| 4,254,822 | 3/1981 | Geier | 165/48.2 |
| 4,373,308 | 2/1983 | Whittaker | 52/173.3 |
| 4,437,511 | 3/1984 | Sheridan | 165/48.2 |
| 4,651,080 | 3/1987 | Wallace | 320/2 |
| 5,014,770 | 5/1991 | Palmer | 165/48.2 |

FOREIGN PATENT DOCUMENTS

| 58-18060 | 2/1983 | Japan | 52/173.3 |

OTHER PUBLICATIONS

Alternative Energy Source Book, (Real Goods) Published by: "Real Goods Trading Corporation." pp. 27–69.

Primary Examiner—Aaron Weisstuch

[57] ABSTRACT

A self-sufficient apparatus and method for conveying solar heat energy from an attic (20) under a solar energy absorbing roof (10) to a place remote from the attic. A synergetic combination of in-attic air controlling devices such as fans and motorized vents (40a, 40b) are energized by stored electrical energy generated by a sunlight-to-electrical-energy panel (14), located adjacent the roof. The panel, preferably a photovoltaic array, has a limited size, providing just sufficient electrical energy to operate the electrical elements of the apparatus. It will not impair the heat absorbing capability of the roof and can be located where it is not aesthetically objectionable. In a preferred embodiment a forced-air-to-water heat exchanger (30) provides solar heated domestic hot water (90). In another embodiment solar heated attic air is drawn into a fan (50) and forced via a duct to another part of the building (100).

10 Claims, 1 Drawing Sheet

SELF-SUFFICIENT APPARATUS AND METHOD FOR CONVEYING SOLAR HEAT ENERGY FROM AN ATTIC

FIELD OF INVENTION

This invention relates to solar heating systems, and more particularly to a self-sufficient low cost system which uses a substantially structurally unmodified attic.

BACKGROUND

There are a number of inventions which use the attic of a building as a source for solar heated air, or water or the like. A discussion of the usefulness of devices which convey the heat energy to places remote from the attic is well covered in 1985, U.S. Pat. No. 4,502,467 by Smith, and in 1981, U.S. Pat. No. 4,242,872 by Shaw, and in 1980, U.S. Pat. No. 4,241,725 by Emon et al. I have given a thorough coverage of the subject in my 1991, U.S. Pat. No. 5,014,770. It has been a major objective of these and other similar inventions to remove heat energy from the attic in the most efficient manner and with the lowest capital investment, and to minimize the cost of extracting the heat energy from the roof of a building. However, all of the above inventions are not completely self-sufficient. They require an electricity source, generally provided by a local community power plant and produced by burning fossil fuel.

Self-sufficient solar energy converting devices have been invented such as photovoltaic cell arrays and thermosyphon solar-energy-to-liquid heat exchanger panels. These may be mounted on roof tops, or in non-shaded open spaces. Windmills erected in high places are also used in some cases, but they tend to be less reliable. These devices are effective but are generally considered to be aesthetically objectionable. The non-traditional look of solar roof panels and efficient windmills has caused people to reject them for all but industrial areas. Recently, in many suburban areas, ordinances have been written to disallow the use of "in-view" solar panels and windmills. Even if these self-sufficient devices could be aesthetically improved, initial installation costs are prohibitively high and based on the present day relatively low cost of fossil fuel energy, they appear to be a poor investment.

A self sufficient attic-based solar heating system is especially needed for heating air and water of buildings which are in places where it is impractical to include electricity from a community power plant.

SUMMARY

The present invention is a synergetic combination of solar energy collecting devices which is totally self-sufficient, has a low initial cost, is simple to install, is not aesthetically objectionable, requires very little maintenance, and is compatible with low voltage electronic controlling devices. It uses an electrical energy generating solar cell array of small size, limited to supplying the electrical energy required by in-attic solar heat energy controlling devices. Examples of such devices are: forced-air-to-liquid heat exchangers, fans for delivering heated attic air to a place remote from the attic, and power controlled vents for trapping solar heated air. This combination provides a surprisingly effective way to extract heat energy from a heat absorbing roof. It uses readily available proven components. The electrical elements of the heat energy controlling devices are generally low voltage motors, pumps, relays, and electronic circuits which require relatively small amounts of power. These devices are disposed close to the solar cell array in a structurally unmodified attic, under a structurally unmodified roof which collects and absorbs solar energy. Most of the electrical elements can be standard automotive parts. These rugged, efficient electrically driven components are well suited to the environment in which they will be employed.

Solar cell arrays operate most efficiently when the electrical storing means is a low voltage, 6 or 12 volt battery. As battery weight does not usually cause a problem for this stationary application, well proven rechargeable lead-acid batteries are an excellent choice for the electrical energy storing means. A low DC voltage of 6 or 12 volts is also compatible with most electronic control systems and DC motors are easily speed controlled to optimise system efficiency.

The invention does not need the excessive roof area normally required by on-roof solar panels. Typically a photovoltaic cell array will produce storable solar-electric energy at the rate of 45 watthours per day, per square foot of solar panel, based on 5 peak sun hours per day. A forced-air-to-water heat exchanger requires less than 187 watts of power while it is running. If solar heat collection covers 10 hours per day with the electrical elements typically running 25% of the time; an 11 square foot solar panel would provide sufficient electricity to run the heat exchanger. This is less than 0.5% of the roof area of an average suburban home. This small solar panel will easily supply the intermittent needs of an air-forcing fan, or for an electric motor powered vent, or for a fan conveying hot air from the attic to a room in the building below the attic. The size of the solar panel has an insignificant effect on the solar heat energy collecting capability of the roof. In most cases the solar panel can be located "out of sight" so that it does not interfere with the aesthetic appearance of the building. In cases where solar panels are absolutely restricted by community ordinances, they may be located in the attic under a skylight. This tends to reduce the efficiency of the solar cells, but the solar heat collecting capability of the roof will increase because the skylight enhances solar heat transfer, providing a net gain in solar energy available in the attic; consequently a fan motor of lower power is required to handle the required heat transfer. The traditional unmodified heat absorbing roof required for in-attic solar heat energy collection allows easy installation. Maintenance is low because most of the component parts are protected in the attic, from wind, rain, hail, snow, and ultraviolet light.

In a preferred embodiment, charge current from the solar panel to the battery is sensed and used as a control device to close the attic vents to contain the heated attic air, and to start the fan of a forced-air-to-water heat exchanger when sunlight is present. A thermostatic switch senses the attic air temperature and is used as a control element to keep the fan operating while the attic air temperature is sufficient to raise the temperature of the liquid, even when the charge current ceases, due to lack of sunlight, caused by heavy cloud cover, or at night. A battery charge level switch is included to isolate the circuit which distributes electrical current to the electrical elements from the battery. This charge level switch ensures that all circuits are receiving sufficient voltage to operate safely. If the battery voltage level falls below a predetermined value it electrically isolates the distribution circuit from the battery. Individual control circuits responding to external control signals provide a way to introduce programmed or manual override control to the apparatus. The external control signals may be used to adjust the apparatus based on knowledge of fundamental variations in weather patterns and the demands for the use of the solar heated water.

DETAILED DESCRIPTION

Figure 1:
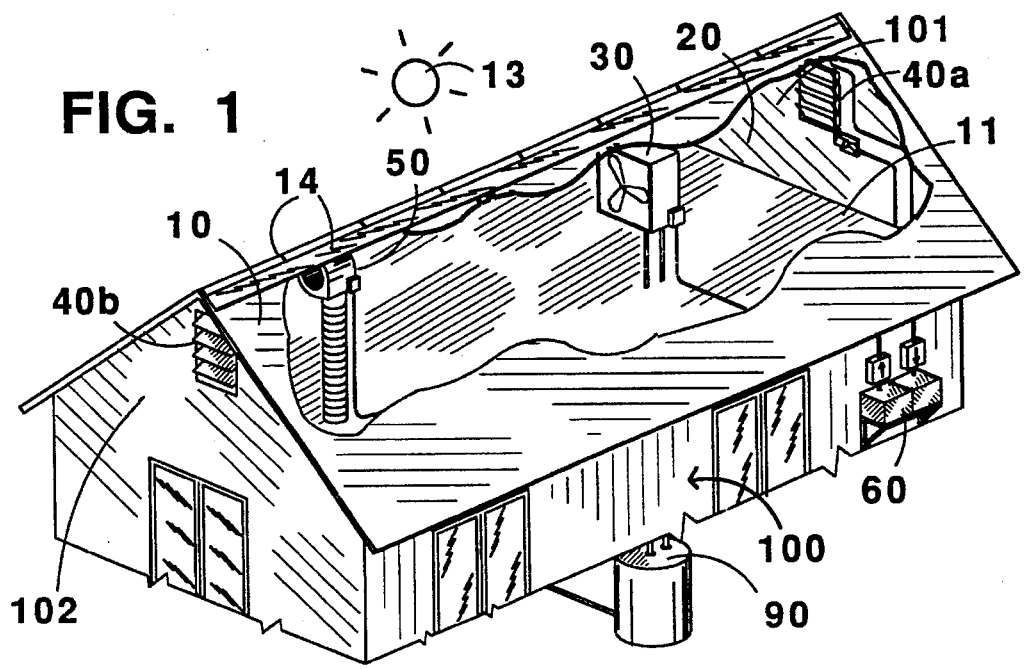
FIG. 1: A sectioned perspective view of the major elements of the invention.

FIG. 1 shows a building 100 with a section removed from roof 10 to reveal attic 20. Building 100 also has its lower portion removed to reveal hot water tank 90. electrically powered air vents 40a and 40b are solar energy controlling means because they control the ingress and egress of air to and from attic 20. A forced air to liquid heat exchanger 30 is shown mounted in attic 20 under the roof apex where upper-attic air is drawn through the heat exchanger by an electrically operated fan. The liquid (usually water for a hot water system) flows through pipes to and from (hot water) tank 90. The forced air to liquid heat exchanger 30 is a solar energy controlling means which also conveys solar heat to a remote place away from the attic.

An electrically operated fan assembly 50 is mounted in attic 20 under the roof apex. When operative, the fan draws air from the upper portion of attic 20 and forces it out of the attic via a duct through floor 11 of attic 20 into the lower portion of building 100. Fan assembly 50 is a solar energy controlling means which conveys solar heated air to a remote place away from the attic.

A solar cell array 14 traverses roof 10 and is a narrow panel close to the roof apex positioned to be aesthetically unobjectionable and to optimize the collection of sunlight. A second portion of the solar array 14 is similarly disposed on roof 10 in an opposing position (hidden). This solar array is limited in size to supply sufficient, but no more, electrical energy than is needed to operate the electrical elements included in the solar energy controlling means in the attic. It should be positioned such that it enables roof 10 to provide the maximum solar heat collecting area. It may be positioned under a skylight in the attic.

Roof 10 collects solar heat from sun 13 and heats the air in attic 20 under roof 10, which is enclosed by end walls 101 and 102, and attic floor 11. Sufficient light must fall on the solar cell array 14 to charge battery 60 to a voltage level which indicates that the battery has stored sufficient energy to safely supply the electrical power needs of every air controlling means which can be simultaniously operated in attic 20. When battery 60 is sufficiently charged, vents 40a and 40b can be energized and closed so that hot attic air is prevented from escaping. The fan assembly 50, or the air to liquid heat exchanger 30, or both, can then be operated to extract the heat stored in attic 20 and convey it away from the attic.

Figure 2:
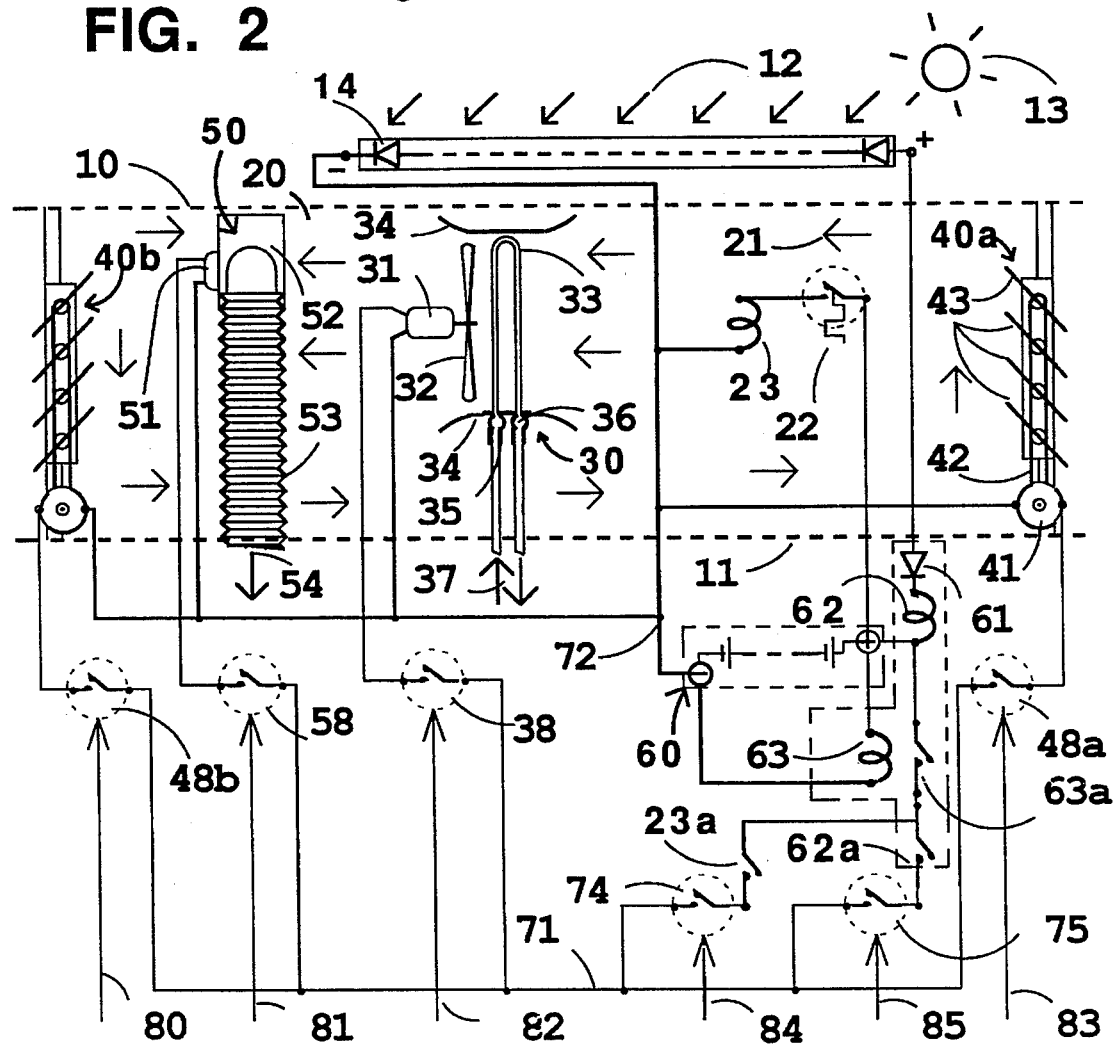
FIG. 2: A schematic diagram of a preferred embodiment of the invention.

FIG. 2 shows a schematic of fan assembly 50, forced-air to liquid heat exchanger 30 and electrically powered vents 40a and 40b operating in attic 20 under roof (broken line) 10, and over floor 11 (broken line).

Solar cell array 14 is positioned above roof 10 receiving sunlight rays 12 from sun 13. Attic air flow is depicted by arrows typified by arrow 21. Typical vent 40a has louvers 43 actuated by mechanism 42 to open and close the vent driven by electric motor 41. Fan 50 is driven by an electric motor 51. When operating it draws attic air in and forces it via duct 53 to a place remote from the attic in a direction indicated by arrow 54. Forced air to liquid heat exchanger 30 when operating, draws attic air over and past a plurality of heat exchanger coils depicted by typical sectioned coil 33, by means of fan 32 driven by motor 31. The air flow path is controlled by Venturi 34 (shown in section form). Coils 33 connect input manifold 35 to output manifold 36 so that liquid (usually water) can flow as shown by arrows 37. This liquid (usually water) generally circulates by thermosyphon method or by being pumped, to and from a hot liquid (water) tank.

Battery 60 provides an electrical energy storing means, usually positioned in a convenient place for easy maintenance outside the attic. It is charged by electric charge current from solar cell array 14 via a charging circuit. The charging circuit includes a rectifier 61, a charge current sensing relay coil 62, and a charge level sensing relay coil 63. Typically the electrical system is designed around a 12 volt battery. Automotive batteries, relays, cables, and motors, are readily available at low cost, and they suit the all-weather environment required of such a system. Normally-open relay contacts 63a will close when the battery is charged to a predetermined voltage level providing a current path to a distribution circuit which controls the current flow to each solar energy controlling means in attic 20.

When the solar cell array 14 provides more than a predetermined charge-current, normally-open supply circuit contacts 62a will close, energizing positive distribution bus 71, if control switch 75 is closed. When the attic air heats to a predetermined temperature, thermally operated switch 22 will close, providing a current path via relay coil 23 to negative bus 72, actuating relay 23 to close normally-open supply circuit, contacts 23a, to provide a current path to positive distribution bus 71 if control switch 74 is closed. The charge-current responsive current path is useful for starting to regulate the air flow in attic 20 by means of the vents; typically the vents would be activated to start to close and trap the solar heat. It also allows the water heating to commence immediately, based on sensing a portion of the sunlight falling on roof 10. The attic air temperature responsive current path is useful when the attic is still hot at times when sunlight is intermittent or when there is no sunlight.

Individual electrical supply circuits control the current flow to each solar heat energy controlling means. Electric motor 41 for vent 40a is controlled by control switch 48a. The electric motor for vent 40b is controlled by control switch 48b. The fan motor 51 for fan assembly 50 is controlled by control switch 58. The fan motor 31 for forced-air-to-liquid heat exchanger 30 is controlled by control switch 38. Each of the control switches 48b, 58, 38, 74, 75, and 48a, are responsive to external control signals 80, 81, 82, 84, 85, and 83, respectively; which may be operated by a remote contol unit, possibly a computer.

Items such as fuses, circuit breakers, motor over-temperature switches and items normally used in accordance with safety, maintenance etc. have not been included in the figure as these items are within the knowledge of a person of ordinary skill in the art of electrical construction.

While the invention has been particularly shown and described in the reference to preferred embodiments, it will be understood by those skilled in the art that various modifications and changes in form and detail may be made without departing from the spirit and scope of the invention.

What I claim is:

1. A self-sufficient solar energy collecting and conveying apparatus, comprising:

(a) a roof, collecting solar heat energy;

(b) an attic, under said roof receiving and storing said solar heat energy, said stored solar heat energy heating air in said attic;

(c) a forced-air-to-liquid heat exchanger means, having a fan operably driven by an electric motor cooperating with a Venturi means to draw said air in said attic over and past a plurality of heat transfer coils containing liquid, said liquid conveying said stored solar heat energy from said attic to a place remote from said attic;

(d) a distribution circuit electrically connecting an electrical energy storing means to said fan;

(e) said electrical energy storing means receiving electric charge current via a charging circuit from an electrical energy generating means, said charge current charging said electrical energy storing means with electrical energy;

(f) said electrical energy generating means disposed adjacent said roof receiving sunlight and converting it to said electric charge current.

2. The solar energy collecting and conveying apparatus of claim 1, wherein said electrical energy generating means comprises an array of photo-voltaic elements.

3. The solar energy collecting and conveying apparatus of claim 1, wherein said electrical energy storing means is a rechargeable battery.

4. The solar energy collecting and conveying apparatus of claim 1, including a supply switching means for electrically disconnecting said electrical energy storing means from said distribution circuit, when said electrical energy in said electrical energy storing means falls below a predetermined level.

5. The solar energy collecting and conveying apparatus of claim 1, further comprising an electrically powered attic venting means for controlling egress of said air in said attic from said attic and ingress of outside air to said attic, said distribution circuit electrically connecting said electrical energy storing means to said attic venting means.

6. The solar energy collecting and conveying apparatus of claim 1, including a charge current switching means for electrically disconnecting said electrical energy storing means from said distribution circuit, when said charge current in said electrical energy storing means falls below a predetermined level.

7. The solar energy collecting and conveying apparatus of claim 1, wherein said distribution circuit further comprises an attic air temperature switch responsive to the temperature of said air in said attic.

8. A self sufficient method for collecting solar heat energy and conveying it to a place remote from an attic, comprising the steps of:

(a) collecting solar heat energy by means of a roof over an attic, said roof collecting heat by being exposed to sunlight, said roof heating attic-air in said attic;

(b) drawing said attic-air through a Venturi means, over and past a plurality of heat transfer coils in a forced-air-to-liquid heat exchanger means by means of an electrically operated fan so that said heat is transferred to liquid flowing in said coils whereby it can be conveyed in said liquid to a place remote from said attic;

(c) converting solar energy in said sunlight to electrical energy using a sunlight-to-electrical-energy generating means;

(d) energizing said fan with said electrical energy.

9. The self sufficient method for collecting and conveying solar heat energy recited in claim 8, including the additional step of charging an electrical energy storing means with said electrical energy provided by said sunlight-to-electrical-energy generating means.

10. The self sufficient method for collecting and conveying solar heat energy recited in claim 8, including the additional step of adjusting ingress of external-air to said attic and egress of said attic-air from said attic via at least one electrically operated vent to control said heat in said attic air.

* * * * *